United States Patent [19]

Keuter

[11] Patent Number: 4,796,563
[45] Date of Patent: Jan. 10, 1989

[54] WIRE MESH FLOORING

[75] Inventor: Dale H. Keuter, Earlville, Iowa

[73] Assignee: Eastern Iowa Pork, Earville, Iowa

[21] Appl. No.: 39,708

[22] Filed: Apr. 20, 1987

[51] Int. Cl.$^4$ .............................................. A01K 1/00
[52] U.S. Cl. ..................................................... 119/28
[58] Field of Search ................ 119/28, 27, 16; 52/342

[56] References Cited

U.S. PATENT DOCUMENTS 4,018,188  4/1977  Burdette ................................. 119/28
4,573,432  3/1986  Boxhorn et al. ....................... 119/28
4,628,662 12/1986  Nooyen ............................. 119/28 X Primary Examiner—Robert Peshock
Attorney, Agent, or Firm—James C. Nemmers

[57] ABSTRACT

The main or warp wires in the mesh flooring are shaped with a flat surface on top and have a cross-sectional shape so that the widest portion of each warp wire is at or near the top flat surface. The warp wires also have high and low surfaces with the high and low surfaces of adjacent wires alternated in accordance with a predetermined pattern to improve both comfort and resistance to slipping. This construction also permits the use of straight cross wires so that the wire mesh floor will rest firmly on flat surfaces and support systems in existing installations.

4 Claims, 1 Drawing Sheet

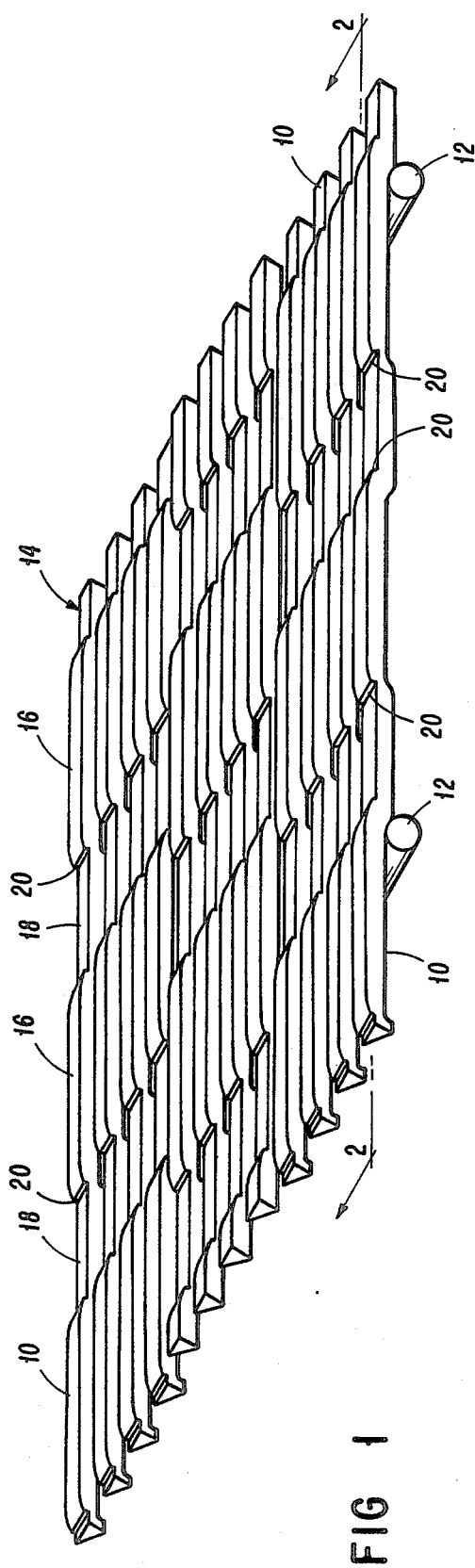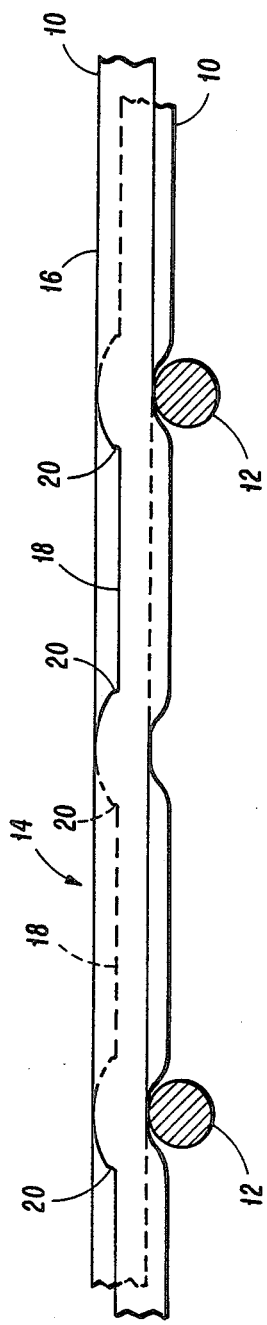

WIRE MESH FLOORING

BACKGROUND OF THE INVENTION

In the breeding or raising of pigs, newborn baby pigs are commonly confined with the sow in farrowing pens. After the pigs are weaned, they are then placed in hog finishing buildings until they are ready for market. These pens and buildings have been traditionally designed to provide feed areas, rest areas and also to provide ease of cleaning and waste removal. Typically, the flooring in such buildings should allow the waste to drop through to a pit beneath the flooring, and in order to accomplish this, various flooring designs have been developed and commercially used.

One such flooring is a wire mesh flooring which consists of woven wire in which the warp and cross wires are woven together in a manner to provide rectangular shaped openings between the wires to permit the passage of waste. The wires must be spaced sufficiently close so that the pigs' feet cannot slip through the openings but permit the easy passage of waste to a pit beneath the floor. One disadvantage of the common wire mesh flooring is that it tends to produce abrasions on the legs, knees and feet of the pigs. This is because the woven wires are typically circular in cross-section and therefore provide a very small contact surface which tends to abrade or cut the animals. Attempts have been made to overcome the discomfort caused by this type of flooring by flattening the round wires, but this weakens the wires and results in an undesirable deflection that makes the pigs nervous.

In U.S. Pat. No. 4,573,432 issued on Mar. 4, 1986 to John F. Boxhorn and George R. Boxhorn, there is disclosed improved flooring in which warp wires are used that are flat on top and which have a cross-sectional shape so that the widest portion of each wire is at or near the top surface. The warp wires are then woven with cross wires which extend alternately over and under the adjacent warp wires. To accommodate the cross wires, the top surface of each warp wires has a depression formed in t at each junction with the cross wire so that the cross wire will not extend above the top surface of the warp wire. This does provide mesh flooring which has a flat top surface that is more comfortable and minimizes the abrasion problem. Although this type of flooring is an improvement over the traditional wire woven flooring, the flooring does not have high resistance to slipping and can be difficult to install in existing installations because the bottom surface is not sufficiently flat due to the woven cross wires.

There therefore remains a need for an improved flooring for the floors of hog pens and finishing buildings, which flooring will be durable, provide sufficient traction for the hogs while yet being comfortable for the animals. Such a flooring should also be capable of being installed in existing buildings without substantial modification to the supporting structure.

SUMMARY OF THE INVENTION

The improved wire mesh flooring of the invention uses warp wires that are flat on top and which have a cross-sectional shape so that the widest portion of each wire is at or near the top flat surface. This thus provides a comfortable flooring with a large surface area and minimizes the abrasion problem. Such warp wires are also easily cleanable while maintaining superior strength against deflection. In the invention however the warp wires are not straight along their longitudinal length, but have alternating highs and lows which serves two important purposes. First, by alternating the highs and lows of adjacent warp wires in accordance with a predetermined pattern, greatly improved resistance to slipping is achieved. Also, the design of the warp wires permits them to be combined with standard, straight cross wires. This lower the cost and also provides a finished floor that will rest firmly on flat surfaces and which can be used in existing building installations without modification of the floor support system.

BRIEF DESCRIPTION OF THE DRAWINGS

FIG. 1 is a perspective view of a section of wire mesh flooring constructed according to the principles of the invention; and FIG. 2 is a sectional view taken on the line 2—2 of FIG. 1.

DESCRIPTION OF THE PREFERRED EMBODIMENT OF THE INVENTION

Referring first to FIG. 1, there is shown a section of wire mesh flooring constructed according to the principles of the invention and in which a plurality of warp wires 10 are connected to and supported by cross wires 12. Warp wires 10 all extend in the same direction, are parallel to each other and are spaced-apart. The cross wires 12 run transversely to the warp wires 10 and are also spaced-apart and parallel to each other. It will be noted from FIG. 1 that there are substantially fewer cross wires 12 than there are warp wires 10.

The spacing of the warp wires 10 provides open spaces that are sufficiently large to permit the easy passage of waste into the pit typically constructed beneath the flooring formed by the wire mesh. However, the distance between the warp wires 10 is sufficiently small that a small pig can comfortably walk over the flooring without its feet slipping through an opening and becoming caught. Also, the spacing is such that the teats of the sow cannot get caught, which is a problem with prior art flooring designs.

It is preferred that the warp wires 10 are spaced closer together than the typical wire mesh flooring in order to improve comfort without loss of cleanability. Each warp wire 10 preferably has a cross-sectional shape that provides a flat top surface 14 along the entire length of each wire 10. The cross-sectional shape of each warp wire 10 is also shaped so that the widest portion is at or near the top flat surface. Obviously, a variety of cross-sectional shapes could be used for the warp wires 10, but the preferred shape is one that tapers from the top to bottom and in which the ratio of the height of each wire 10 to its width is equal to or greater than 1. It has been found that this provides a wire that will have sufficient strength to minimize flexing of the finished floor. Also, the tapered shape also facilitates cleaning since once the waste passes through the openings between the flat top surfaces 14 of the wires 10, the openings become larger. Also, the flat top surfaces of the warp wire 10 also provide a maximum surface area for a floor of this type thus resulting in a comfortable surface for little pigs and sows thereby greatly reducing abrasions and sores that might otherwise be created.

The cross wires 10 are preferably formed from a steel wire round in crosssection. These wires are the least expensive and provide the best strength. The cross wires 12 are straight, and in order to maintain the comfortable, flat surface of the finished floor while providing improved traction, the warp wires are formed with high surfaces 16 and low surfaces 18 alternating along the longitudinal length of each wire. This does not detract from the comfort of the finished flooring, and it provides greatly improved resistance to slipping as the baby pigs and sows move over the flooring. This is especially true when the adjacent warp wires 10 are arranged in a predetermined pattern with alternating high surfaces 16 and low surfaces 18. One such pattern is shown in FIG. 1 of the drawings in which four adjacent warp wires are arranged with the highs and lows aligned and then the next four warp wires are staggered relative to the first set of four wires. This provides not only a comfortable surface but one with improved traction.

In order to accomplish proper support of warp wires 10 by the cross wires 12, the cross wires 12 extend under the portions of the warp wires 10 which have been deformed upwardly to provide the high surfaces 16. With the staggered pattern shown in FIG. 1, it will be noted that the warp wires 10 had their high surfaces 16 either aligned or overlapped when the pattern is staggered. This permits the cross wires 12 to be straight regardless of the pattern of arrangement of the warp wires 10 that is used. The finished flooring in all instances will then be able to rest firmly on a flat surface or on existing support systems. This is all accomplished without any loss in strength or durability. In addition, the cost of producing the wire mesh flooring of the invention is kept to a minimum because straight cross wires can be utilized which cross wires are of a standard round cross-sectional shape and are thus readily available at a minimum cost.

The drawings also show that each warp wire, at the juncture of the high surface 16 with the low surface 18 has formed a notch 20. The purpose of this notch is to provide increased resistance to slipping in a direction along the longitudinal length of the warp wires 10.

Having thus described the invention in connection with the preferred embodiment thereof, it will be evident to those skilled in the that various revisions and modifications can be made to the preferred embodiment without departing from the spirit and scope of the invention. It is my intention, however, that all such revisions and modifications as are obvious to those skilled in the art will be included within the scope of the following claims.

What is claimed is:

1. Flooring for livestock buildings comprising a plurality of longitudinally-extending wires which are parallel to each other and spaced apart a sufficient distance to permit the passage of waste through the flooring while close enough to prevent the feet of animals from being caught between adjacent wires, each longitudinally-extending wire having a plurality of alternate high and low portions along its length, the longitudinally-extending wires being arranged in a pattern so that a selected number of longitudinally-extending wires form a first group with the high portions and low portions aligned with each other and a selected number of the longitudinally-extending wires form a second group with the high and low portions aligned with each other, the first group of longitudinally-extending wires having its high portions staggered with respect to the high portions of the second group thus forming alternate groups of high and low portions throughout the flooring, and cross wires extending substantially transversely to the longitudinally-extending wires to provide support for the longitudinally-extending wires, the crosswires being positioned so as to be always beneath the high portions of the longitudinally-extending wires, the crosswires thereby all lying in the same plane.

2. The flooring of claim 1 in which the transition from the high portion to the low portion of each longitudinally-extending wire is an abrupt transition thus forming a notch that provides improved resistance to slipping for the animals.

3. The flooring of claim 1 in which each longitudinally-extending wire has a flat top surface and its cross-sectional shape has its widest portion near the top flat surface.

4. The flooring of claim 3 in which the cross-sectional shape of each crosswire is circular.

* * * * *